B. M. VANDERVEER.
Calculator.
No. 4,632. Patented July 14, 1846.
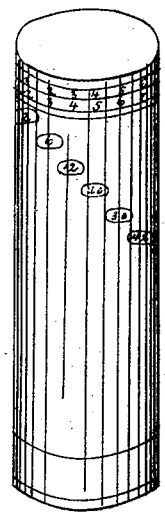
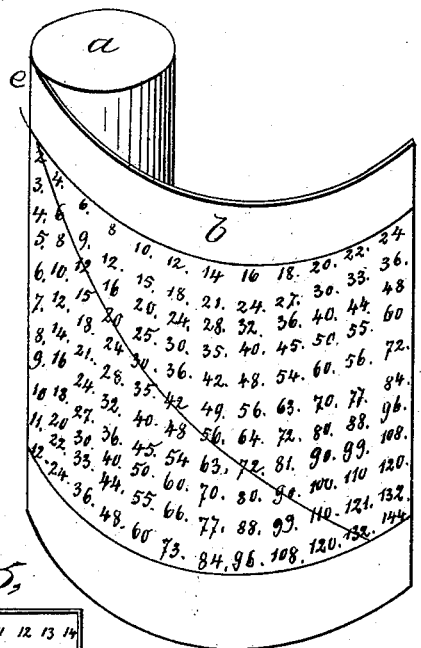
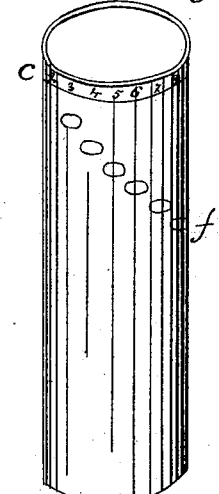
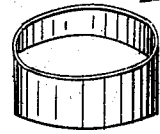
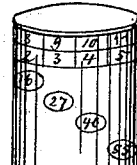
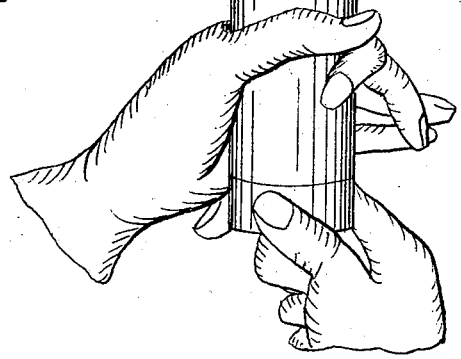

UNITED STATES PATENT OFFICE.

BENJN. M. VAN DER VEER, OF CLYDE, NEW YORK.

TEACHING ARITHMETIC.

Specification of Letters Patent No. 4,632, dated July 14, 1846.

*To all whom it may concern:*

Be it known that I, BENJN. M. VAN DER VEER, of Clyde, in the county of Wayne and State of New York, have invented a new and improved mode of teaching children and youth in the fundamental rules of arithmetic by means of tables arranged on rollers, called by me the " rotary multiplication, addition, and subtraction tables; " and I do hereby declare that the following is a full, clear, and exact description of the construction, operation, and use of the same, reference being had to the annexed drawings, making a part of this specification, in which—

Figure O is a perspective view of a multiplication table when completed—Figs. 1, 2, 3 and 4 being sectional parts of the same.

To make or construct this table from unit to twelve, take a wooden roller turned in a lathe, four inches long and one and a quarter inches in diameter, as shown by letter *a*, Fig. 1, around which paste *b*, a printed table of the products of the multipliers *c*, Fig. 3, and the multiplicands *d*, Fig. 2. When done, make a cap or head of pasteboard as shown by Fig. 2, around the lower edge of which paste the figures to be multiplied, as *d*, spacing them equidistant around the circumference as designated by the vertical lines between them, Fig. 2, so as to correspond with the rows or columns of figures in the table now pasted on the roller. Then wet the cap on the inside with paste so as to cause it to become fixed, and slip it on to the top of the roller, observing that the figure 1 is placed directly over the first figure in the table on the roller at the top, to wit, Fig. 2. Now make Fig. 3, a cylinder of the diameter of the cap, by laying a copy of the table *b* flat upon a piece of pasteboard of the same dimensions, less the heighth of the cap, and punching out and through the pasteboard with a tool of sufficient size to cover them, the figures cut by the diagonal line *e*, running through the table *b*, which gives the holes shown by letter *f*, Fig. 3. This done, form the cylinder by wrapping the pasteboard around a roller of the size of *a*, with the table on—then paste the lap of the edges, and when dry take it off and slip it on to the lower end of the roller *a*, shoving it up to the cap—under which, and around the upper edge of the cylinder, paste the figures used as multipliers, first turning the cylinder so as the upper hole will show the figure 2 in the table, as represented in Fig. O, then paste the row of multipliers aforesaid around the upper edge of the cylinder, placing the first figure (2,) over the hole and immediately under the first figure (1,) in the row of multiplicands around the cap. When done, cut off the lower end of the cylinder below the holes, take it off, wet it with paste inside and slip it on again to become fixed by the paste. This done, and the fancy covering put on, the table is completed; the operation and use of which, is shown at once on turning the cylinder around the roll, which carries the multipliers to the multiplicand, giving the unerring result through the hole immediately under. The following being a particular descriptive explanation of the whole operation and mode of using the model table herewith, and the manner of combining the parts for the purpose of teaching, &c., viz.: 1st, to multiply: Suppose the pupil is required to answer the following question by the above mentioned table—How many are two times eight? He takes the table in his hands as shown by Fig. 7, gripping the foot below the cylinder with the thumb and forefinger of his right hand, and with the thumb and forefinger of his left hand slightly holding on to the cylinder, he turns the roller around which the cylinder moves, to the right or left, as choice may dictate, with the right hand thumb and finger aforesaid. Now he looks for figure 2 in the row of figures pasted around the top of the cylinder and when found he turns the figure 2 to the right or left until he brings it under figure 8 in the row of figures pasted around the cap or head above—and finds the answer to be 16, as seen through the hole in the cylinder immediately under the 2 and 8. 2nd, to add: Suppose the pupil be required to add the figure or figures seen through any one hole in the cylinder to the figure or figures standing immediately over that hole at the top of the cylinder; for instance, let him add 16 (the figures seen through the hole as the answer to the question in multiplication, above) to the figure 2 right over the hole. This is done by turning the figure 2 to the right hand one section, or under the figure 9—and the answer is immediately seen through the hole to be 18. 3rd, to subtract: For example, let the pupil take 2 from 18, the figures seen through the hole as the answer to the question in addition. This is done by turning the figure 2, to the left hand one section, or under the figure 8—and the answer will be seen through the hole to be 16. 4th, to divide: Require the pupil to divide 2 into 16, the figures seen through the hole as the answer to the question in subtraction—and he will find the answer immediately over the 2 on the cap or head, to be 8. 5th, the manner of showing not only the particular result, but different results at one and the same time through the holes: For instance, take the first example of multiplying; while the pupil sees the result of 2 times 8 to be 16, he sees by the next section to the right hand, that 3 times 9 are 27 through the hole under that section—that 4 times 10 are 40, that 5 times 11 are 55, &c.

This table, with the others specified above, viz, addition and subtraction tables, may be enlarged to any given combination of figures, upon the same principle.

The addition table is made and operates precisely as the first, (only with different results) by taking the form shown by Fig. 5, in the place of that of *b*, Fig. 1. Also the subtraction table, by simply adopting the form of heading shown by Fig. 6, or any other form of numbers upon the same principle that convenience or choice may determine, (and so with the other tables) making up the table for the roller from their products.

What I claim as my invention, is—

The form of these tables—and the operation of bringing together the figures or numbers to be multiplied, added or subtracted; and the novel manner of showing not only the particular product, but a series of different products at one and the same time, through the holes—giving the pupil the advantage of eleven results before his eyes without confusion or distraction: And in the language of an eminent teacher, who has examined the tables, " relieving the young learner from the tedium and irksomeness with which the knowledge of the combination of simple numbers has been heretofore burdened."

BENJAMIN M. VAN DER VEER.

Witnesses:
Isaac Miller,
Hiram P. Jones.